Patented Aug. 20, 1929.

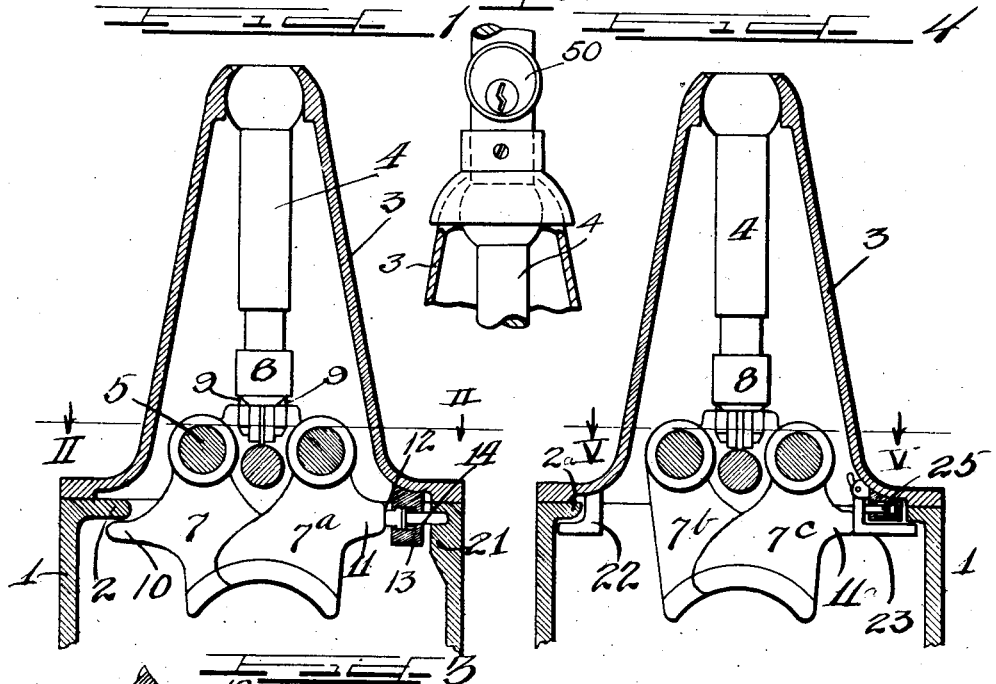

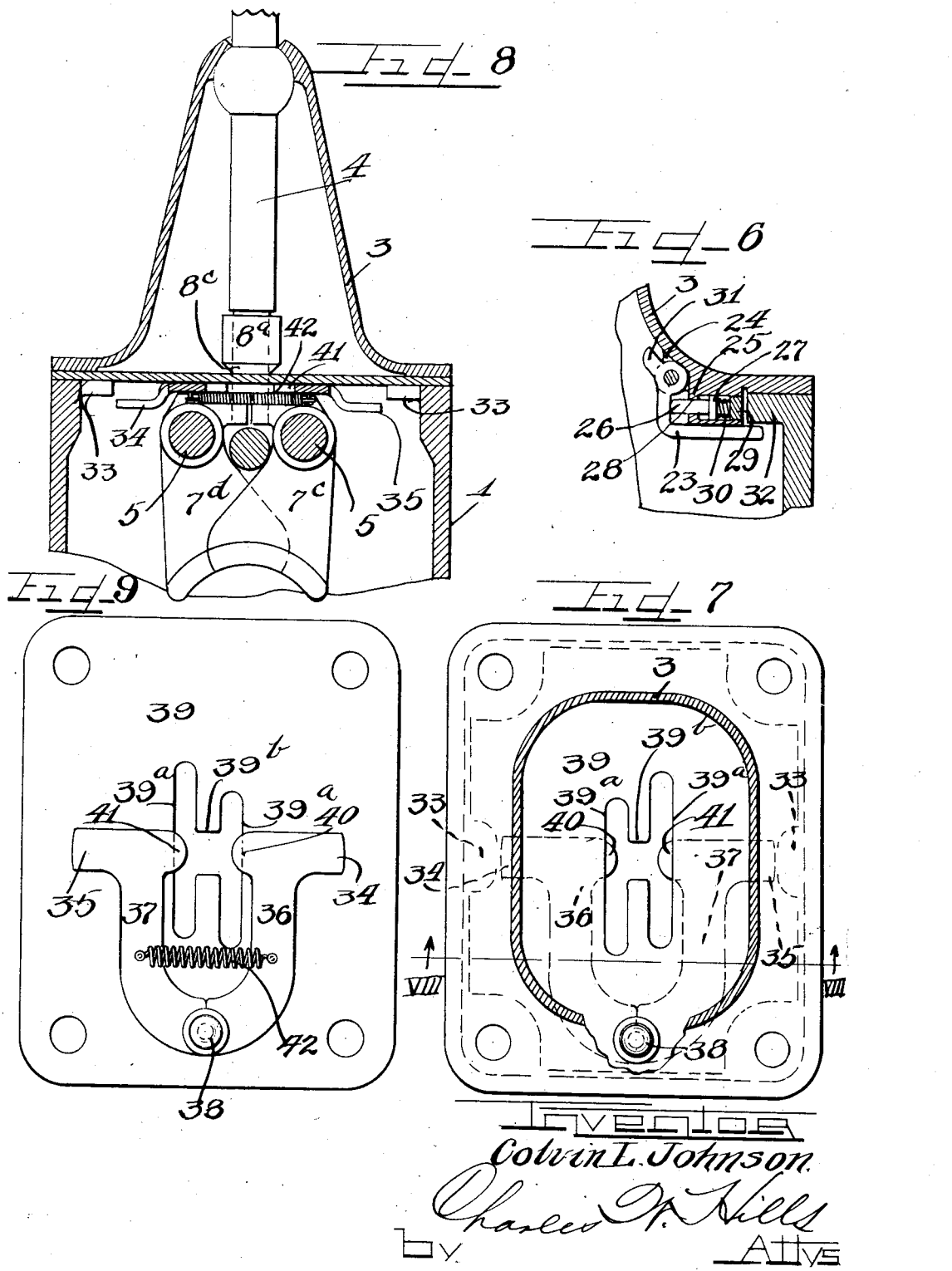

1,724,939

UNITED STATES PATENT OFFICE.

COLVIN L. JOHNSON, OF ST. LOUIS, MISSOURI, ASSIGNOR, BY MESNE ASSIGNMENTS, TO JOHNSON AUTOMOBILE LOCK CO., OF ST. LOUIS, MISSOURI, A CORPORATION OF MISSOURI.

TRANSMISSION-COVER-LOCKING MEANS.

Application filed November 12, 1925. Serial No. 68,519.

This invention relates to means for preventing the removal of transmission housing covers except when the transmission gears are in predetermined unlocked position. It is customary, in order to prevent theft or unauthorized use of automobiles and other gear operated mechanisms, to lock the transmission gears thereof in a predetermined position by a suitable locking means. While such means are highly successful in accomplishing their purpose, it is nevertheless possible in certain cases to remove the transmission housing cover and the gear locking means, after which the gears may be shifted from the predetermined position as desired and the mechanism driven. It is accordingly an object of this invention to provide an improved and efficient locking means for transmission housing covers.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary vertical section with parts omitted taken through the center of the transmission housing cover and universal support for the gear shift lever therein of a device embodying this invention.

Figure 2 is a horizontal section with parts omitted taken on the line II—II of Figure 1.

Figure 3 is an enlarged detail fragmentary sectional view showing the spring pressed plunger of Figure 1 and parts associated therewith.

Figure 4 is a sectional view similar to that of Figure 1 but showing a modified form of the device embodying this invention.

Figure 5 is a horizontal sectional view taken at the line V—V of Figure 4.

Figure 6 is an enlarged fragmentary detail section of the spring pressed plunger of Figure 4, showing the parts associated therewith.

Figure 7 is a horizontal section taken similarly to Figures 2 and 5 but showing a modified form of the device embodying this invention, with parts omitted.

Figure 8 is a vertical fragmentary section taken at the line VIII—VIII of Figure 7 and with parts omitted.

Figure 9 is a bottom plan view with parts omitted of the parts shown in Figure 7.

Figure 10 is a fragmentary view partly in section of an intermediate portion of the lever illustrating the lock.

As shown on the drawings:

Reference numeral 1 indicates a transmission housing which has provided at its upper left edge an inwardly extending lug 2. A transmission housing cover 3 fits over the upper edge of the housing 1 and is suitably secured to said housing by means of retaining screws or studs (not shown). The cover 3 is provided with a central upwardly extending dome portion which affords a universal support for a gear shift lever 4. The gear shift lever 4 is provided with a depending portion which extends downwardly through the interior of the dome portion of the cover 3. Mounted in the cover 3 and extending longitudinally thereof are parallel rods 5 which have blocks 6 slidably mounted thereon. The adjacent faces of the blocks 6 have notches or recesses formed therein adapted to receive the lower end of the depending portion of the gear shift lever 4. Depending from the blocks 6 and integral therewith are gear shifting forks 7 and 7ª which engage transmission gears (not shown) in the housing 1 to shift said gears to a plurality of operative positions away from the neutral or inoperative position. When the forks 7 and 7ª are in the position shown in Figs. 1 and 2 with their adjacent faces opposite each other, the gears are in neutral or inoperative position. A key operated lock 50 is mounted in a suitable position relative to the gear shift lever 4. A collar 8 is provided surrounding the depending portion of the lever 4 and is connected to be raised or lowered by the key operated locking means to unlocked or locked position, respectively. The movement of the collar by the key operated lock 50 may be effected in a manner well known to those familiar with the lock art. The means connecting the lock to the collar may take a number of different forms such, for example, as that disclosed in my previous Patents Reissue No. 15,104, 1,369,925, 1,394,258, and 1,408,888. The collar 8 is provided with a pair of depending lugs 9 which are slidable on either side of the lower portion of the lever 4 and adapted when said collar is actuated to lowered position to fit on either side of the lower portion of said lever in the respective recesses in the adjacent faces of the blocks 6. When the lugs 9 are in the respective recesses in the blocks 6, they will act to hold the lever 4 and said blocks securely in neutral or inoperative position. When the collar 8 is raised by the key operated means, the depending lugs thereon will leave the aforementioned recesses to release the lever 4 and the blocks 6 so that the same may be actuated to shift the gears to any desired operative position. Vertically aligned with the fork 7 and integral therewith is an outwardly extending ear 10 which when the fork 7 is in neutral position, is in position beneath the lug 2. When the fork 7 is shifted from neutral position, a slight amount, the ear 10 will be automatically moved from beneath the lug 2. Vertically aligned with the fork $7^a$ and integral therewith is an outwardly extending ear 11. The ear 11 is provided at its extreme tip with a rounded portion 12. Secured to the under right hand side of the cover 3 adjacent the edge thereof is a depending member 13. The member 13 is horizontally recessed to receive a plunger 14. The plunger 14 is provided with a left hand portion 15 which is slidable in an aperture 16 communicating with the left end of the recess of the portion 13. A collar 17 integrally formed to the right of the portion 15 acts to limit the left hand movement of the plunger 14 and also acts as an abutment for a compression spring 18 which surrounds the right hand portion of the plunger 14. The spring 18 is held against the collar 17 by an apertured nut 19 which closes the right hand end of the recess in the member 13. The member 13 is positioned so that when the right hand fork 7 is moved to neutral position, the tip 12 will actuate the plunger 14 to the right, causing the latter to enter into a recess 20 in an enlarged portion 21 of the wall of the housing 1.

In the device shown in Figures 4 to 6 inclusive, the ear 10 is dispensed with and a depending angular lug 22 is provided beneath the cover 3 at the left hand side adjacent the edge thereof. The lug 22 is adapted at all times, independently of the forks $7^b$ and $7^c$ to extend beneath an inwardly extending lug $2^a$ at the left upper edge of the housing 1. In the latter modification the tip of an ear $11^a$ similar to the ear 11 is of a slightly larger horizontal section than the latter and is adapted when the fork $7^c$ is actuated to neutral position to abut and pivot an angle member 23 to the right. The angle member 23 is pivoted between a pair of lugs 24 secured inwardly and near the upper edge of a depending member 25 similar to the member 13 of the previous embodiment. The member 25 is recessed in the same manner as the member 13 of the previous embodiment and is provided with a plunger 26. The plunger 26 has a cylindrical head 27 and a left hand reduced portion which extends outwardly through a horizontal aperture 28 in the left end of the member 25. The right end of the recess in the member 25 is closed by a nut 29. A compression spring 30 between the nut 29 and the head 27 acts to hold the plunger 26 outwardly for holding the pivoted angle member 23 to the left. A stop 31 above the pivot point on the member 23 acts to limit the outward movement of the latter. The lower leg of the angle member 23 when the latter is held to the right by the ear $11^a$ will be in position beneath an inwardly extending lug 32 adjacent the upper right hand edge of the housing 1. When the fork $7^c$ is shifted away from neutral position, the ear $11^a$ will be moved from the left of the member 23 and the latter will be actuated outwardly by plunger 26 to release the lower leg of said member 23 from beneath the lug 32. The tip of the ear $11^a$ being tapered and the outward movement of the member 23 by the plunger 26 being limited, said member will be actuated back to enter beneath the lug 32 by said ear when the fork $7^c$ is returned to neutral position. It will be obvious that in both of the aforementioned modifications the shafts 5 might be mounted in the housing 1 as well as in the cover 3 and that when the shafts are so mounted the lug 2 would merely have to be secured beneath the cover 3 and the ear 10 fashioned so as to be positioned above the lug 2 when in neutral position instead of beneath said lug as is now the case.

In Figures 7 and 8 there is shown a modified form in which the shafts 5 are mounted in the housing 1. A pair of oppositely positioned inwardly extending lugs 33 are provided integral with the casing 1 adjacent the upper inner edges thereof for receiving therebeneath the tips 34 and 35 of a pair of locking arms 36 and 37, respectively. The locking arms 36 and 37 may be stamped from sheet metal, are opposite and similar and are each pivoted at one end to a common pivot point by means of a pin 38 secured in a plate 39 mounted between the cover 3 and the upper edge of the casing 1. The plate 39 is preferably riveted to the lower edge of the cover 3. The plate 39 is provided with a pair of longitudinal horizontally spaced slots $39^a$ which are joined by a central transverse slot $39^b$ for permitting the lower end of the lever 4 to extend through said plate and to be actuated to longitudinally shift the blocks 6. The arms 36 and 37 are pivoted near one end of the plate 39 and extend longitudinally toward the center thereof, the tips 34 and 35 being positioned on the outer edges of said arms adjacent the inner ends. On the inner edges of the arms 36 and 37 opposite to the tips 34 and 35 respectively, are inwardly extending tips 40 and 41. A tension spring 42 secured at either end to the respective arms 36 and 37 acts to normally hold the inner tips 40 and 41 of said arms 36 and 37 respectively against the lower portion of the lever 4 for holding the tips 34 and 35 away from locking position beneath the lugs 33. When the key operated mechanism is actuated to lower a collar 8ª, a tapered portion 8ᶜ on the lower edge of the latter will engage with the tips 40 and 41 for forcing the arms 36 and 37 outwardly to cause the tips 34 and 35 to enter beneath the lugs 33. When the tips 34 and 35 are beneath the lugs 33, the cover 3 may not be removed to permit unauthorized operating of the gears to defeat the key operated locking means. It will also be obvious from the modification shown in Figures 1 to 3 inclusive and Figures 4 to 6 inclusive that when the shifting forks are in neutral position, the cover 3 may not be removed so as to defeat the key operated locking means. It will be obvious to those skilled in the art that I have provided an efficient means for locking a transmission housing cover against removal, except when the gears therein are shifted from the predetermined neutral position.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In combination, a housing, gear shift means in said housing, a shiftable lever adapted to operate said means and adapted to be moved into a given position, a cover for said housing, and movable means adapted to be cammed into a position in which it locks the cover to the housing when said lever is moved into said given position.

2. In combination, a gear shift housing, gear shift means in said housing, a shiftable lever adapted to operate said means and adapted to be moved into a given position, a cover for said housing, movable means adapted to be moved into a position in which it locks the cover to the housing when said lever is moved into said given position, and resilient means for acting on said latter means to unlock the cover from the housing when said lever is moved out of said given position.

3. In combination, a housing, gear shift means in said housing, a shiftable lever arranged to operate said means and movable into a given position in which it may be locked against operation, a cover for said housing, and pivotal means movable about its pivot from an unlocked position relative to said cover and housing into a position in which it locks the cover to said housing when said lever is in said given position.

In testimony whereof I have hereunto subscribed my name.

COLVIN L. JOHNSON.